(12) United States Patent
Liang et al.

(10) Patent No.: US 11,048,856 B2
(45) Date of Patent: *Jun. 29, 2021

(54) INFORMATION SHARING METHOD, APPARATUS AND COMPUTER DEVICE

(71) Applicant: TENCENT TECHNOLOGY (SHENZHEN) COMPANY LIMITED, Shenzhen (CN)

(72) Inventors: Zhu Liang, Shenzhen (CN); Xin Feng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/670,627

(22) Filed: Oct. 31, 2019

(65) Prior Publication Data

US 2020/0065359 A1 Feb. 27, 2020

Related U.S. Application Data

(63) Continuation of application No. 14/263,258, filed on Apr. 28, 2014, now Pat. No. 10,496,733, which is a
(Continued)

(30) Foreign Application Priority Data

Apr. 17, 2012 (CN) .......................... 201210112130.5

(51) Int. Cl.
*G06F 40/134* (2020.01)
*H04L 29/08* (2006.01)
(Continued)

(52) U.S. Cl.
CPC .......... *G06F 40/134* (2020.01); *H04L 65/403* (2013.01); *H04L 67/306* (2013.01); *H04W 4/21* (2018.02)

(58) Field of Classification Search
None
See application file for complete search history.

(56) References Cited

U.S. PATENT DOCUMENTS

| 7,730,216 B1 | 6/2010 | Issa et al. |
| 8,799,658 B1 | 8/2014 | Sellier et al. |

(Continued)

FOREIGN PATENT DOCUMENTS

| CN | 101079847 B | 11/2007 |
| CN | 1 01 901 256 B | 12/2010 |

(Continued)

OTHER PUBLICATIONS

Sharejosie, "How to repost on Facebook", Apr. 11, 2011, Youtube. pp. 1-7 (Year: 2011).

(Continued)

*Primary Examiner* — Howard Cortes
(74) *Attorney, Agent, or Firm* — Oblon, McClelland, Maier & Neustadt, L.L.P.

(57) ABSTRACT

Described is an information sharing method and apparatus, which are directed to information published by a user in a social network. For information published by a user in a social network, when a sharing instruction of the user is received, a selection box comprising one or more sharing targets is displayed for the user, each sharing target has its corresponding social network, and the social network corresponding to the sharing target includes a social network which published the information; when a submission instruction of the user is received, the information is sent to a sharing target selected by the user from the selection box. By using the present method, the spread of information can be accelerated, and the implementation is simple and convenient.

19 Claims, 3 Drawing Sheets

Related U.S. Application Data continuation of application No. PCT/CN2013/074289, filed on Apr. 17, 2013.

(51) Int. Cl.
*H04W 4/21* (2018.01)
*H04L 29/06* (2006.01)

(56) References Cited

U.S. PATENT DOCUMENTS

| | | | |
|---|---|---|---|
| 8,905,763 B1* | 12/2014 | Hu | G09B 25/00 434/365 |
| 9,064,236 B2 | 6/2015 | Gazetov et al. | |
| 9,391,993 B1* | 7/2016 | Winer | H04L 63/101 |
| 9,871,757 B1 | 1/2018 | Reardon | |
| 10,217,117 B2 | 2/2019 | Heath | |
| 2007/0233692 A1 | 10/2007 | Lisa et al. | |
| 2008/0027909 A1 | 1/2008 | Gang et al. | |
| 2009/0158176 A1 | 6/2009 | Kalaboukis et al. | |
| 2009/0234876 A1 | 9/2009 | Schigel et al. | |
| 2010/0077045 A1* | 3/2010 | Bercu | H04L 51/36 709/206 |
| 2010/0153284 A1 | 6/2010 | Hoag et al. | |
| 2010/0274887 A1 | 10/2010 | Sanghavi | |
| 2011/0066636 A1 | 3/2011 | Guido et al. | |
| 2011/0083167 A1* | 4/2011 | Carpenter | H04L 65/403 726/4 |
| 2011/0258535 A1 | 10/2011 | Adler, III et al. | |
| 2012/0030587 A1 | 2/2012 | Ketkar | |
| 2012/0072566 A1* | 3/2012 | Oho | G06Q 50/01 709/223 |
| 2012/0110064 A1 | 5/2012 | Chen et al. | |
| 2012/0136936 A1* | 5/2012 | Quintuna | G06F 21/6245 709/204 |
| 2012/0143761 A1* | 6/2012 | Doran | G06Q 20/40 705/44 |
| 2012/0150661 A1 | 6/2012 | DeStein et al. | |
| 2012/0151322 A1 | 6/2012 | Lindsay et al. | |
| 2012/0151383 A1 | 6/2012 | Kazan et al. | |
| 2012/0290953 A1 | 11/2012 | Russell et al. | |
| 2012/0311509 A1 | 12/2012 | Maggiotto et al. | |
| 2013/0132177 A1 | 5/2013 | Ha | |
| 2013/0173634 A1 | 7/2013 | Shaban Hussein | |
| 2013/0191762 A1 | 7/2013 | Rajagopalan et al. | |
| 2013/0246522 A1 | 9/2013 | Bilinski et al. | |
| 2014/0237335 A1 | 8/2014 | Liang et al. | |
| 2016/0275193 A1 | 9/2016 | Abrams et al. | |

FOREIGN PATENT DOCUMENTS

| | | |
|---|---|---|
| CN | 102270085 B | 12/2011 |
| JP | 2008-217255 A | 9/2008 |
| JP | 2009-199368 A | 9/2009 |
| JP | 2012-069110 A | 4/2012 |
| JP | 2011-108094 A | 2/2014 |

OTHER PUBLICATIONS

Office Action Issued in corresponding JP Application No. 20140542709 dated Jun. 30, 2015.

Office Action issued in corresponding Chinese Application No. 201210112130.5 dated Mar. 2, 2015 with a Concise English Explanation.

* cited by examiner

For information Z published by a user X on a social network Y, When receiving a sharing instruction sent by the user X, displaying a selection box for the user X, wherein displaying at least three sharing targets, each sharing target corresponding to one social network, the social network Y is one of the three social networks corresponding to the three sharing targets — 11

Sending the information Z to the sharing target selected by the user X when receiving a submission instruction from the user X — 12

Fig. 1

MISS-F:Shekou seafood market, and@keven eat seafood, encounter@Yu Gao and his wife Yesterday 12: 52 by iphone comment (2) sharing, rebroardcast, checking more micro-blog

INFORMATION SHARING METHOD, APPARATUS AND COMPUTER DEVICE

CROSS REFERENCE TO RELATED APPLICATIONS

This application is a continuation of U.S. Ser. No. 14/263,258 filed Apr. 28, 2014, which is a U.S. continuation application under 35 U.S.C. § 111(a) claiming priority under 35 U.S.C. §§ 120 and 365(c) to International Application No. PCT/CN2013/074289 filed Apr. 17, 2013, which claims the priority benefit of Chinese Patent Application No. 201210112130.5 filed Apr. 17, 2012, the contents of which are incorporated by reference herein in their entirety for all intended purposes.

FIELD

The present disclosure relates to network technologies, more specifically, to an information sharing method, apparatus and computer device.

BACKGROUND

The section provides background information related to the present disclosure which is not necessarily prior art.

In the related art, a variety of different social networks (such as micro-blog) are supplied for users, to make the users make friends through the social networks.

Presently, the information posted by a certain user on a social network only can be seen by other users (such as the user's friends) on the same social network. If the user wants the information to be seen by the user's friends on other social networks, the user only adopts the following approach: the user logs into the other social networks to post the information to make the user's friends see the posted information. However, the approach is inconvenient and could not contribute to promote information.

SUMMARY

Accordingly, there provides an information sharing method and an information sharing apparatus, which may accelerate dissemination of information, and easy to implement.

An information sharing method includes:
receiving a sharing instruction sent by a client user;
displaying a selection box comprising one or more sharing targets; each sharing target corresponding to one social network, and social networks, corresponding to the one or more sharing targets, comprising a social network where a preset information is published;
receiving a selection of one sharing target from the selection box; and
sending the preset information to the sharing target selected from the selection box when receiving a submission instruction from the client user.

An information sharing apparatus, includes:
a processing module configured to receive a sharing instruction sent by a client user, display a selection box comprising one or more sharing targets; each sharing target corresponding to one social networks, and social networks, corresponding to one or more sharing targets, comprising a social network where a preset information is published;
a sharing module configured to receive a selection of one sharing target from the selection box, and send the preset information to the sharing target selected from the selection box when receiving a submission instruction from the client user.

A computer device, comprising: a processor, a memory, and a display screen, wherein the memory stores computer instructions, to make the processor implement the following operations:
receiving a sharing instruction sent by a client user;
displaying a selection box comprising one or more sharing targets; each sharing target corresponding to one social network, and social networks, corresponding to the one or more sharing targets, comprising a social network where a preset information is published;
receiving a selection of one sharing target from the selection box; and
sending the preset information to the sharing target selected from the selection box when receiving a submission instruction from the client user.

It can be seen that adopting the embodiments of the present invention, the user can share the information published on a certain social network to other social networks, which accelerates dissemination of information. Moreover, for the user, the user only implements some simple operations, such as sending relevance instructions, and the implementation is simple and convenient.

BRIEF DESCRIPTION OF THE DRAWINGS

In order to illustrate technical solutions according to embodiments of the disclosure, a brief description of drawings that assists the description of embodiments of the invention or existing art will be provided below. It would be apparent that the drawings in the following description are only for some of the embodiments of the invention. A person having ordinary skills in the art will be able to obtain other drawings on the basis of these drawings without paying any creative work.

DETAILED DESCRIPTION OF ILLUSTRATED EMBODIMENTS

For problems of the related art, the present invention provides an information sharing solution that can accelerate the dissemination of information, and easy to implement.

Figure 1:
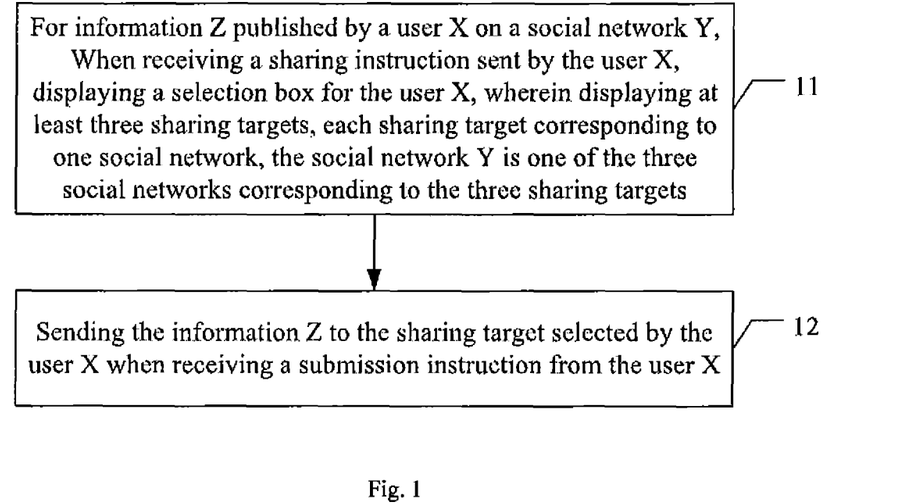
FIG. 1 is a flowchart of an example of an information sharing method according to various embodiments.

Referring to FIG. 1, it is a flowchart of an example of an information sharing method according to various embodiments. The information sharing method includes following steps.

Step 11: for information (named information Z) published by a user (named user X) on a social network (named social network Y), when receiving a sharing instruction sent by the user X, displaying a selection box for the user X. Wherein the selection box displays one sharing target or more sharing targets. Each sharing target corresponding to one social network. The social network Y where the information Z is published by the user X is included in the social networks corresponding to the displayed sharing targets.

Step 12: receiving a selection of one sharing target from the selection box, and sending the information Z to the sharing target selected by the user X from the selection box when receiving a submission instruction from the user X.

For easy description, in the embodiments of the present invention, the user X represents a user. The social network Y represents a social network. The information Z represents any information published in the social network Y.

In practice, each sharing target may be defined as the follow contents.

Friends of the user X in a first social network.

A personal space of the user X in a second social network. Or/And

A personal space of the user X in a third social network.

In practice, the first social network may be a QQ space. The second social network may be a micro-biog. The third social network may be a friend network.

A process shown in FIG. 1 will be described in detailed combined the following detailed examples.

For the information Z published by the user X in the social network Y, when receiving the sharing instruction from the user X, displaying the selection box of the sharing target for the user X. The selection box displays three different sharing targets which can be selected. Each sharing target respectively corresponds to one check box. The check box is at checked status by default.

Figure 2:
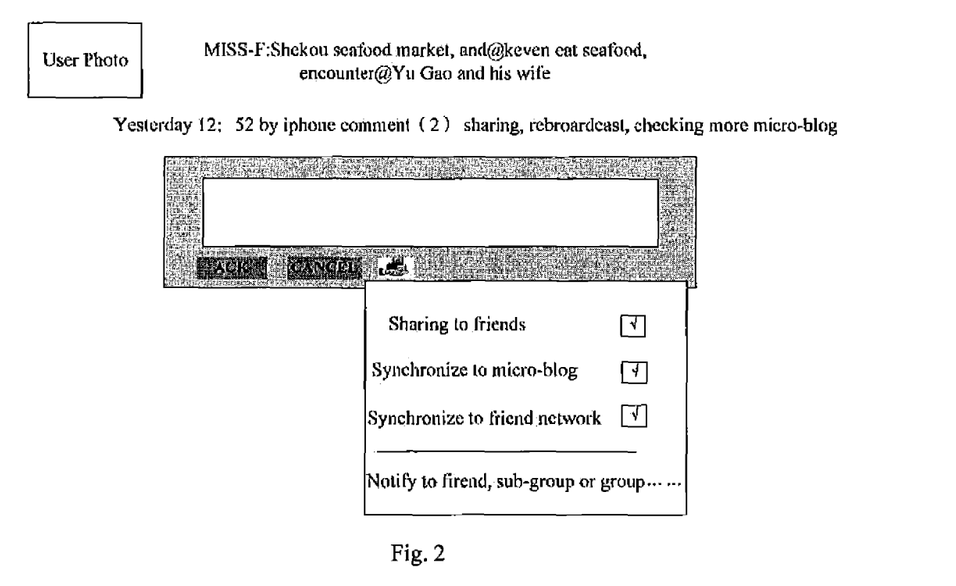
FIG. 2 is a schematic diagram of a sharing target selection box.

Referring to FIG. 2, it is schematic diagram of a sharing target selection box. For micro-blog information published by the user X, when the user X clicks a sharing button corresponds to the micro-blog information, displaying a sharing reason inputting box for the user X. The sharing reason inputting box is blank by default. The user X can input sharing reasons in the sharing reason inputting box. The input sharing reasons are shared to other social network with the micro-blog. The user X can input nothing in the sharing reason inputting box. When the user X hovers a mouse of a computer over an icon of a sharing target, namely, over a hand icon shown in FIG. 2, displaying a drop-down floating layer for the user X. That is, the drop-down floating layer is the sharing target selection box which displays three sharing targets. When the mouse of a computer pull away the icon of the sharing target or the drop-down floating layer for more than one second, the drop-down floating layer disappears. The right of the three sharing targets respectively displays one check box, which are at checked status by default. After the user X clicks a certain check box through the mouse, the mark "√" in the check box disappears, which denotes it is at a non-checked status.

In addition, a search link is displayed in the selection box, namely, "notifying some certain friends, sub-groups, or groups . . . " shown in FIG. 2 located below of the three sharing targets. If the sharing target selected by the user X is the friends of the user X in the first social network, and the user X clicks the search link, the search link can be converted into a search box, and the sharing target box displays object names of all users who have friend relationships with the user X in the QQ zone, to prompt the user X to select. The object names may include friend names, friend group names, group names, sub-group names. The specific meaning of each object name is known in the art. If the user X fails to input keywords in the search box, the information Z is sent to the user corresponding to the object names selected by the user X when receiving the submission instruction from the user X.

If the user X inputs the keywords in the search box, displaying the first social network for the user X. For example, in a social network, such as QQ zone, all object names with a friend relationship with the user X and the input keywords can be selected by the user X. When receiving the submission instruction from the user X, the information Z is sent to the users corresponding to the object name selected by the user X. The keywords input by the user X may be Chinese characters, English, Pinyin, or a combination of the Chinese characters, English, and Pinyin.

Figure 3:
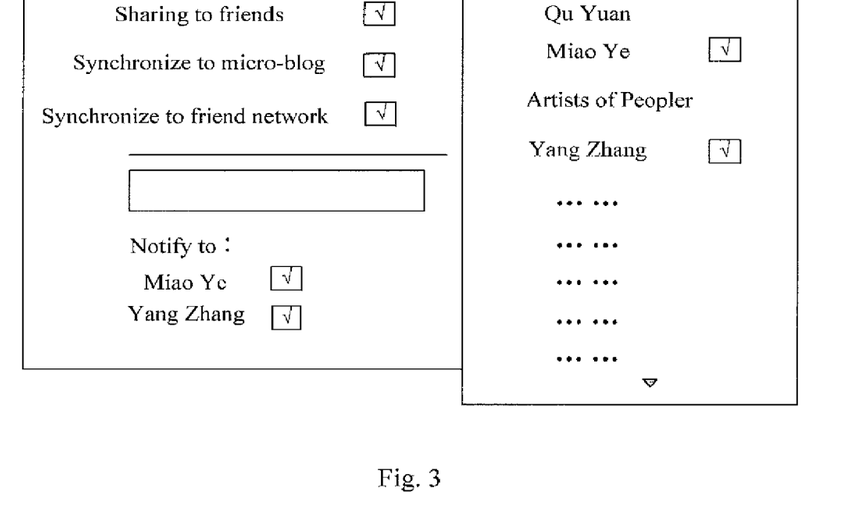
FIG. 3 is a schematic diagram of a user X selecting object names.

FIG. 3 is a schematic diagram of a user X selecting object names. If the sharing target selected by the user X is the friend of the user X in the first social network, and fails to input the keywords in the search box, the right side of the sharing target selection box displays the all object names with friend relationships with the user X in the first social network (such as QQ zone). If the user X inputs the keywords in the searching box, the right side of the selection box displays the all object names which have friend relationships with the user X and satisfy the input keywords in the QQ zone. If the user X moves the mouse of the computer across a certain object name, the right side of the selection box appears the check box. After the user X clicks the check box, the check box appears the mark "√", which denotes the object name is selected, and the check box is no longer disappears. If the object name is not selected, the check box will disappear. Further, referring to FIG. 3, a notification list can be displayed below the search box, namely, "notification to:", and displaying the selected object names and the corresponding check box in the notification list. The object names selected by the user X are saved in the notification list.

In addition, the notification list displays object names of N of the users who have received the information shared by the user X by default, to prompt the user X to select. A time interval between current time and information sharing time of each of the N users is the shortest. N is a positive integer. The value of the positive integer N can be set according to need, such as three. And, the N object names can be sorted in chronological order. Each object name corresponds to one check box, which is at the non-checked status by default. The user X selects one or several even all of the object names according to need. Of course, the user X can select nothing. If the user X has never shared information before, no contents are displayed by default.

Figure 4:
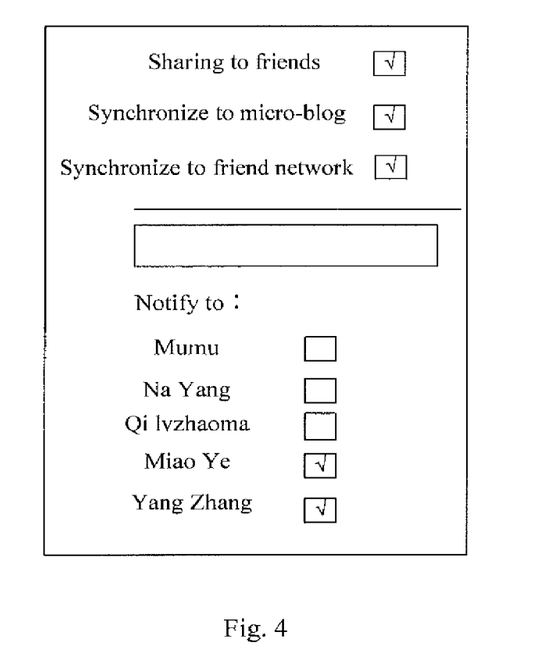
FIG. 4 is a schematic diagram of N object names displayed by default in a notification list.

Referring to FIG. 4, it is a schematic diagram of N (suppose N=3) object names displayed by default in a notification list. In FIG. 4, "Mu Mu", "Na Yang", and "Qi Lu Zhao Ma" are three object names displayed by default. The two object names "Miao Ye" and "Yang Zhang" are added into the notification list by the user X according to a way of FIG. 3.

For the micro-blog information shown in FIG. 2, when the user X finished all selection, namely, can send the submission instruction, the user X click the submit button shown in FIG. 2. Correspondingly, the micro-blog information is shared to the sharing target selected by the user X. Suppose that the user X selects the three sharing targets shown in FIG. 2, the micro-blog information is synchronized to the personal micro-blog of the user X and the personal space of the user X in the Friend network. Further, the micro-blog information is sent to the users corresponding to the object names at the checked status in the notification list. For example, information carrying the content of the micro-blog information is sent to "my space dynamic" of the each QQ zone of the users.

It should be noted that for the friend group name and sub-group names at the checked statues in the notification list, sending information to each user. In addition, if there are the users with the same name, for example, a friend name at the checked status in the notification list is the same to a user's name in the friend group at the checked status in the notification list, the information is only sent to the user once. Moreover, that how to synchronize and how to send information are the prior art.

Further, the micro-blog information published by the user X is shared. The synchronizing the micro-blog information to the personal micro-blog of the user X is equivalent to publishing the micro-blog information again, of which the benefit is that the information in the micro-blog can be displayed in chronological order. New published information is on a top of the information published before, which is easier to be seen by other users.

So far, the above-mention contents describe the embodiments of the information sharing method.

Figure 5:
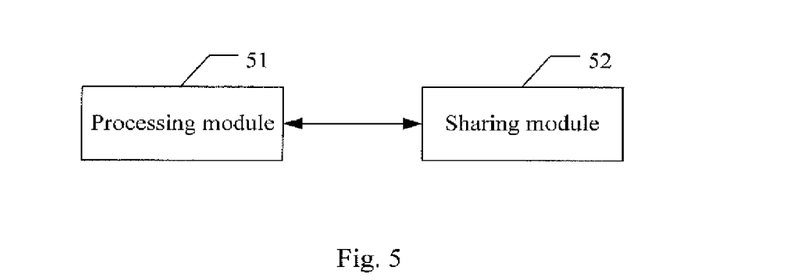
FIG. 5 is a structure diagram of an example of an apparatus for sharing information according to various embodiments.

Based on the above-mentioned contents, referring to FIG. 5, it is a structure diagram of an example of an apparatus for sharing information according to various embodiments. The apparatus includes a processing module 51 and a sharing module 52.

The processing module 51 is used to receive the sharing instruction sent by the user X, and display the selection box including one or more sharing targets. Wherein the selection box displays one sharing target or multiple sharing targets. Each sharing target corresponding to one social network, to prompt the user X to select. The social network Y where the information Z is published by the user X is included in the social network corresponding to the displayed sharing target.

The sharing module 52 is used to receive a selection of one sharing target from the selection box, and send the information Z to the sharing target selected by the user X from the selection box when receiving a submission instruction from the user X.

Specifically, each sharing target may be defined as the following contents.

Friends of the user X in the first social network.

A personal space of the user X in the second social network.

A personal space of the user X in the third social network. Or/And

Further, the sharing target box can display the search link.

If the sharing target selected by the user X is the friends of the user X in the first social network, and the user X clicks the search link, the processing module 51 converts the search link into the search box, and displays the object names of all users who have friend relationships with the user X in the first social network, to prompt the user X to select. The object names may include friend names, friend group names, group names, sub-group names. The sharing module 52 sends the information Z to the users corresponding to the object names selected by the user X when receiving the submission instruction from the user X.

Or, if the sharing target selected by the user X is the friends of the user X in the first social network, and the user X clicks the search link, the processing module 51 converts the search link into the search box. And when the user X inputs the keywords in the searching box, the right side of the selection box displays the all object names corresponding to users who have friend relationships with the user X and satisfy the input keywords in the first social network, to prompt the user X to select. The object names may include friend names, friend group name, group names, sub-group names. The sharing module 52 sends the information Z to the users corresponding to the object names selected by the user X from the selection box when receiving the submission instruction from the user X.

The sharing target selection box further displays the notification list.

Correspondingly, the processing module 51 is further used to save the object names selected by the user X into the notification list. The sharing module 52 is used to send the information Z to the users corresponding to the object names selected by the user X.

The notification list displays object names of the N users who received the information Z shared by the user X in the notification list by default, to prompt the user to select. A time interval between the current time and the information sharing time of each of the N users is the shortest, N is a positive integer.

Correspondingly, the sharing module 52 is further used to send the information Z to the users corresponding to the object names selected by the user X from the N object names displayed by default.

The sharing module 52 is further used to obtain the information Z from the first network application platform, and send the information Z to one or multiple second network application platform when receiving the submission instruction from the user X. Owing to the second network application platform sends the information Z to the social network which the sharing target belongs to. The first network application platform supplies the social network Y. The second network application platform supplies one or multiple social networks which the sharing target belongs to. The sharing target is selected by the user X from the selection box.

In practice, the modules of the apparatus can be located in an instant messaging client or an instant messaging server. For example, the processing module 51 is located in the instant messaging client. The sharing module 52 is located in the instant messaging server. The sharing module 52 located in the instant messaging server receives the submission instruction from the processing module 51 located in the instant messaging client, and sends the information Z to the second network application platform. The second network application platform sends the information Z to the social network which the sharing target belongs to. As another example, the processing module 51 and the sharing module 52 are located in the instant messaging client. The sharing module 52 located in the instant messaging client sends the information Z to the second network application platform located in the instant messaging server. The second network application platform located in the instant messaging server sends the information Z to the social network which the sharing target belongs to. The second network application platform supplies one or multiple social network which the sharing target belongs to.

A person having ordinary skills in the art can realize that the modules of the embodiment can be distributed in the apparatus of the embodiment according to the description of the above-mentioned embodiment. A person having ordinary skills in the art can also realize that the modules of the embodiment can be distributed in one or multiple apparatus. The modules of the above-mentioned embodiment can be combined into one module, or split into multiple sub-modules. A work process of the apparatus of the embodiment shown in FIG. 5 can refer to the corresponding method described in the foregoing description of the embodiment, not repeat it here.

Figure 6:
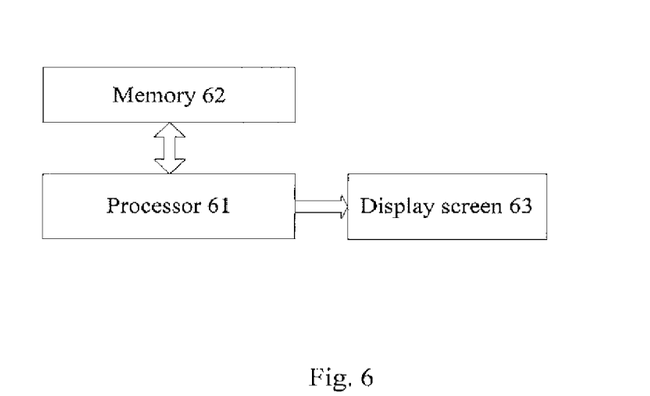
FIG. 6 is a structure diagram of an example of a computer device for sharing information according to various embodiments.

Referring to FIG. 6, it is a structure diagram of an example of a computer device for sharing information according to various embodiments. The device includes a processor 61, a memory 62, and a display screen 63.

The memory 62 stores computer instructions. The computer instructions make the processor 61 implement the following operations.

For the information Z published by the user X on the social network Y, the display screen 63 receives the sharing instruction by the user X, and displays the selection box including the sharing target for the user X selecting when the display screen 63 receives the sharing instruction from the user X. Wherein the display screen 63 displays one or multiple sharing targets. Each sharing target corresponding to one social network, to prompt the user X to select. The social network Y where the information Z published by the user X is included in the social networks corresponding to the displayed sharing targets.

When receiving a submission instruction from the user X, sending the information Z to the sharing target selected by the user X from the selection box.

Specifically, each sharing target may be defined as the following contents.

Friends of the user X in the first social network.

A personal space of the user X in the second social network. Or/And

A personal space of the user X in the third social network.

The memory 62 is further used to store computer instructions. The computer instructions make the processor 61 implement the following operations.

The display screen 63 further displays a search link in the sharing target box.

If the sharing target selected by the user X is the friends of the user X in the first social network, and the user X clicks the search link, the search link is converted into the search box, and the display screen 63 displays the object names of all users who have friend relationships with the user X in the first social network, to prompt the user X to select. The object names may include friend names, friend group names, group names, sub-group names. When receiving the submission instruction from the user X, sending the information Z to the users corresponding to the object names selected by the user X.

Or, if the sharing target selected by the user X is the friends of the user X in the first social network, and the user X clicks the search link, the search link is converted into the search box. And when the user X inputs the keywords in the searching box, the display screen 63 displays the all object names which have friend relationships with the user X and satisfy the input keywords in the first social network in the right side of the selection box, to prompt the user X to select. The object names may include friend names, friend group names, group names, sub-group names. When receiving the submission instruction from the user X, sending the information Z to the users corresponding to the object names selected by the user X.

The memory 62 further stores computer instructions. The computer instructions make the processor 61 implement the following operations.

The display screen 63 further displays the notification list.

Correspondingly, the object names selected by the user X are saved into the notification list. The information Z is sent to the users corresponding to the object names saved into the notification list.

The display screen 63 displays the object names of the N users who received the information shared by the user in the notification list by default, to prompt the user to select. A time intervals between the current time and the information sharing time of each of the N users is the shortest. N is a positive integer.

Correspondingly, the information Z is sent to the users corresponding to the object names selected by the user X from the N object names displayed by default.

Above all, adopting the present invention, the user can share information published on a social network to other social networks, thereby speeding up the promotion of the information. And, the user can only do some simple operations, such as sending relevant instructions, to achieve the promotion of the information, which is simple and convenient.

The above-described contents are only the preferred embodiment of the present invention; it is not intended to limit the present invention. Within the spirit and principles of the present invention, any change, equivalent replacement, improvement, etc., should be included in the present invention, within the scope of protection.

What is claimed is:

1. A method of sharing content, the method comprising:
receiving from a user, a first user selection of a sharing graphic that is displayed in association with content previously shared by the user on a personal space of the user on a first social network service, the first user selection corresponding to a request to provide the content previously shared by the user on the personal space of the user on the first social network service to a personal space of the user on a second social network service;
displaying a sharing target selection interface after the first user selection of the sharing graphic is received, the sharing target selection interface being configured to concurrently display a plurality of social network service sharing targets including the second social network service and a search notification region;
receiving a second selection of the second social network service from the plurality of social network service sharing targets via the sharing target selection interface;
receiving a third selection of the search notification region of the sharing target selection interface; and
displaying a search box in the sharing target selection interface to search for friends of the user in the second social network service in response to the third selection, wherein
the first social network service is different from the second social network service.

2. The method of claim 1, further comprising:
displaying a comment interface that includes a target selection graphic in response to receiving the first user selection of the sharing graphic displayed in association with the content previously shared by the user on the personal space of the user on the first social network service.

3. The method of claim 1, wherein the content is posted by the user on the personal space of the user on the first social network service of the plurality of social network service sharing targets before the first user selection is received.

4. The method of claim 2, further comprising:
displaying a list of the friends having friend relationships with the user in the second social network service,
prompting the user to select at least one friend from the list of the friends, and sending the content to the at least one friend selected by the user when a submission instruction is received from the user.

5. The method of claim 4, further comprising:
displaying a notification list in the sharing target selection interface that includes the selected at least one friend.

6. The method of claim 1, further comprising:
displaying a notification list that includes (i) a first friend having a friend relationship with the user in the second social network service that has been selected by the user; and (ii) a second friend for selection by the user, wherein
the second friend is determined based on when the user previously shared other content with the second friend.

7. The method of claim 1, wherein the content shared by the user on the first social network service includes text that is entered by the user.

8. A non-transitory computer-readable storage medium storing instructions which when executed by a processor cause the processor to perform:
receiving from a user, a first user selection of a sharing graphic that is displayed in association with content previously shared by the user on a personal space of the user on a first social network service, the first user selection corresponding to a request to provide the content previously shared by the user on the personal space of the user on the first social network service to a personal space of the user on a second social network service;
displaying a sharing target selection interface after the first user selection of the sharing graphic is received, the sharing target selection interface being configured to concurrently display a plurality of social network service sharing targets including the second social network service and a search notification region;
receiving a second selection of the second social network service from the plurality of social network service sharing targets via the sharing target selection interface;
receiving a third selection of the search notification region of the sharing target selection interface; and
displaying a search box in the sharing target selection interface to search for friends of the user in the second social network service in response to the third selection, wherein
the first social network service is different from the second social network service.

9. The non-transitory computer-readable storage medium of claim 8, wherein the instructions further cause the processor to perform:
displaying a comment interface that includes a target selection graphic in response to receiving the first user selection of the sharing graphic displayed in association with the content previously shared by the user on the personal space of the user on the first social network service.

10. The non-transitory computer-readable storage medium of claim 8, wherein the content is posted by the user on the personal space of the user on the first social network service of the plurality of social network service sharing targets before the first user selection is received.

11. The non-transitory computer-readable storage medium of claim 8, wherein the instructions further cause the processor to perform:
displaying a list of the friends having friend relationships with the user in the second social network service, prompting the user to select at least one friend from the list of the friends, and sending the content to the at least one friend selected by the user when a submission instruction is received from the user.

12. The non-transitory computer-readable storage medium of claim 11, wherein the instructions further cause the processor to perform:
displaying a notification list in the sharing target selection interface that includes the selected at least one friend.

13. The non-transitory computer-readable storage medium of claim 8, wherein the instructions further cause the processor to perform:
displaying a notification list that includes (i) a first friend having a friend relationship with the user in the second social network service that has been selected by the user; and (ii) a second friend for selection by the user, wherein
the second friend is determined based on when the user previously shared other content with the second friend.

14. An information processing apparatus, comprising:
processing circuitry configured to
receive from a user, a first user selection of a sharing graphic that is displayed in association with content previously shared by the user on a personal space of the user on a first social network service, the first user selection corresponding to a request to provide the content previously shared by the user on the personal space of the user on the first social network service to a personal space of the user on a second social network service of the user;
display a sharing target selection interface after the first user selection of the sharing graphic is received, the sharing target selection interface being configured to concurrently display a plurality of social network service sharing targets including the second social network service and a search notification region;
receive a second selection of the second social network service from the plurality of social network service sharing targets via the sharing target selection interface;
receive a third selection of the search notification region of the sharing target selection interface; and
display a search prompt in the sharing target selection interface to search for friends of the user in the second social network service in response to the third selection, wherein
the first social network service is different from the second social network service.

15. The information processing apparatus of claim 14, wherein the processing circuitry is configured to
display a comment interface that includes a target selection graphic in response to receiving the first user selection of the sharing graphic displayed in association with the content previously shared by the user on the personal space of the user on the first social network service.

16. The information processing apparatus of claim 14, wherein the content is posted by the user on the personal space of the user on the first social network service of the plurality of social network service sharing targets before the first user selection is received.

17. The information processing apparatus of claim 14, wherein the processing circuitry is configured to
display a list of the friends having friend relationships with the user in the second social network service, prompting the user to select at least one friend from the list of the friends, and sending the content to the at least one friend selected by the user when a submission instruction is received from the user.

18. The information processing apparatus of claim 17, wherein the processing circuitry is configured to
display a notification list in the sharing target selection interface that includes the selected at least one friend.

19. The information processing apparatus of claim 14, wherein
the processing circuitry is configured to display a notification list that includes (i) a first friend having a friend relationship with the user in the second social network service that has been selected by the user; and (ii) a second friend for selection by the user, and
the second friend is determined based on when the user previously shared other content with the second friend.

* * * * *